(12) United States Patent
Anderson et al.

(10) Patent No.: US 7,312,786 B2
(45) Date of Patent: Dec. 25, 2007

(54) THREE DIMENSIONAL HUMAN-COMPUTER INTERFACE

(75) Inventors: Paul Anderson, Kllmacolm (GB); Saquib Ibrahim, Glasgow (GB)

(73) Assignee: Qinetiq Limited, London (GB)

( * ) Notice: Subject to any disclaimer, the term of this patent is extended or adjusted under 35 U.S.C. 154(b) by 344 days.

(21) Appl. No.: 10/276,992

(22) PCT Filed: May 17, 2001

(86) PCT No.: PCT/GB01/02144

§ 371 (c)(1),
(2), (4) Date: Dec. 16, 2003

(87) PCT Pub. No.: WO01/90870

PCT Pub. Date: Nov. 29, 2001

(65) Prior Publication Data

US 2004/0080716 A1 Apr. 29, 2004

(30) Foreign Application Priority Data

May 22, 2000 (GB) .................................. 0012275.4

(51) Int. Cl.
*G09G 5/00* (2006.01)
(52) U.S. Cl. ....................... 345/156; 345/163; 345/157; 345/158
(58) Field of Classification Search ................ 345/156, 345/163, 157–158
See application file for complete search history.

(56) References Cited

U.S. PATENT DOCUMENTS

| | | | |
|---|---|---|---|
| 5,583,977 A | 12/1996 | Seidl | |
| 5,670,987 A * | 9/1997 | Doi et al. | 345/156 |
| 5,831,584 A * | 11/1998 | Socks et al. | 345/8 |
| 5,886,818 A | 3/1999 | Summer et al. | |
| 5,905,499 A | 5/1999 | Bolas et al. | |
| 6,211,848 B1 | 4/2001 | Plesniak et al. | |
| 6,388,657 B1 * | 5/2002 | Natoli | 345/168 |
| 6,720,949 B1 * | 4/2004 | Pryor et al. | 345/158 |
| 6,924,787 B2 * | 8/2005 | Kramer et al. | 345/156 |

FOREIGN PATENT DOCUMENTS

WO    95 19584 A    7/1995

OTHER PUBLICATIONS

Hirata et al.; "3-Dimensional Interface Device for Virtual Work Space"; *Proceedings of the IEEE/RSJ International Conference on Intelligent Robots and Systems, Raleigh*, N.C., Jul. 7-10, 1992; vol. 2, Jul. 7, 1992, pp. 889-896, XP000333985 ISBN: 0-7803-0738-0; the whole document.

* cited by examiner

*Primary Examiner*—Richard Hjerpe
*Assistant Examiner*—Leonid Shapiro
(74) *Attorney, Agent, or Firm*—Stolowitz Ford Cowger LLP

(57) ABSTRACT

A Human-Computer Interface that comprises a set of sensors, actuators and computer generated controls is characterised in that the controls are projected in three spatial dimensions by a three dimensional display device and are manipulated by means of an operator interacting with them by movements of the operator's body, these movements being detected using the sensor system, where characteristics of a displayed target volume change according to the movement made, and actuators worn on the body, react according to how the body interacts with the computer generated controls.

20 Claims, 2 Drawing Sheets

THREE DIMENSIONAL HUMAN-COMPUTER INTERFACE

Figure 1:
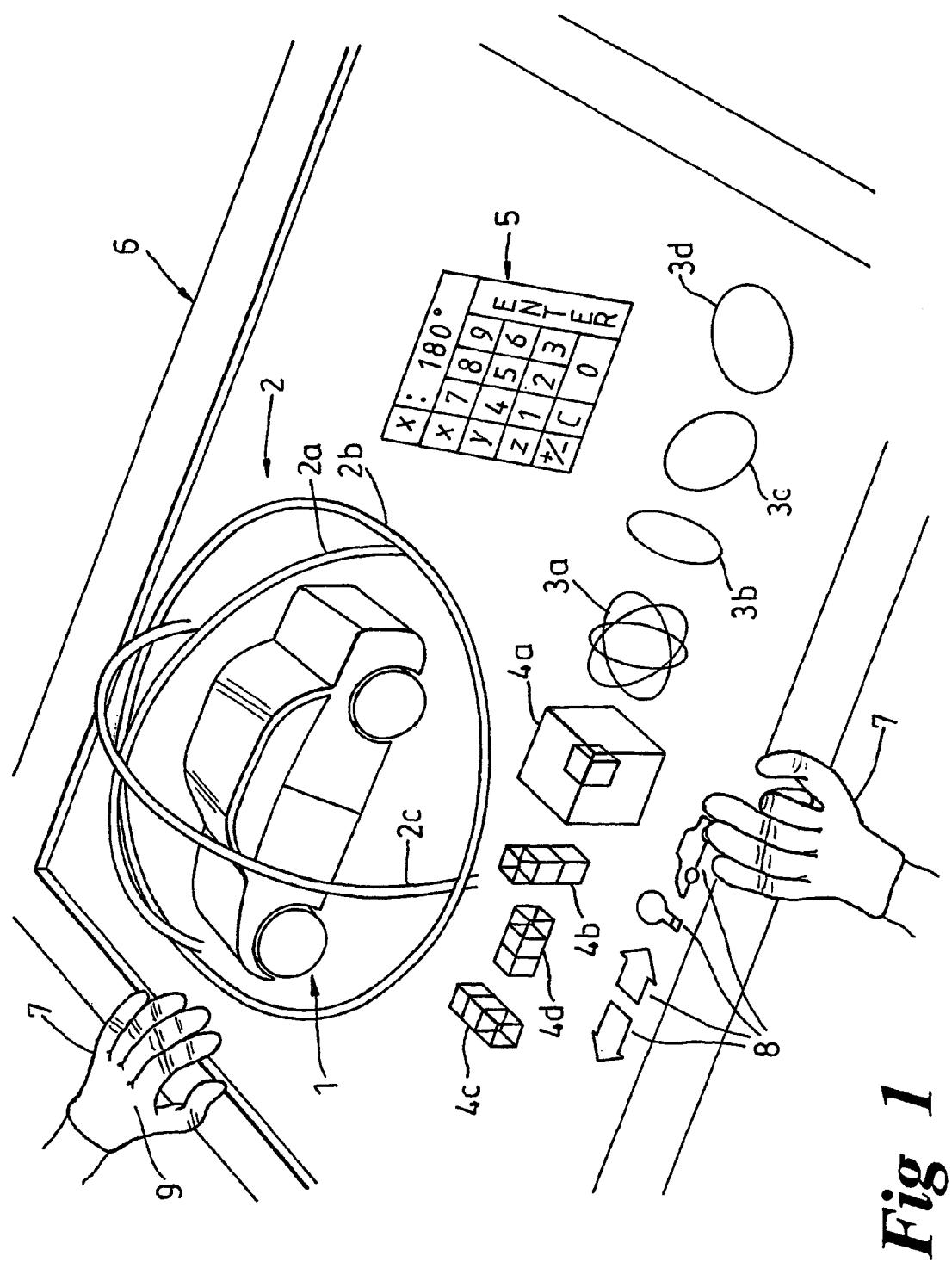

This invention relates to a three dimensional (3D) Human-Computer Interface (HCI), and a method of interacting with a 3D HCI. More specifically, it relates to a system of controls, sensors, tools and actuators that are designed to allow for easy manipulation of images, and any other data that is capable of being projected onto a 3D display system. The sensors and actuators extend in scope to body worn controls such as may be incorporated into a glove or into headgear, or other body worn apparatus, and to audio systems.

PRIOR ART

HCIs exist that have sensors mounted in items of clothing such as gloves. They are normally employed where the user of such a system is wearing a helmet mounted display. Sensors within the glove are used to communicate the position of the user's hand so that a "virtual" hand can be drawn onto the user's display. This way he can know the whereabouts of his hand in relation to other elements of the image.

This has the disadvantage that the user does not get a complete view of his hand, and any subtleties of motion that he is making will be lost. This occurs due to the limited number of sensors on the glove providing a finite resolution, coupled with inevitable errors and delays in the system that plot the position of the hand on to the display.

The present invention does not suffer these problems. Following calibration no "virtual" hand need be displayed. This will avoid problems of over correction present in the prior art that occur due to delay in updating the image as seen by the user whenever a hand movement is made. As the user of the present invention can see what hand movement has been made, he will not feel the need to redo them, or exaggerate the motion as he waits for the display to update.

There are HCI systems in existence that consist of haptic interfaces that provide hand positional information and haptic feedback that are used with two dimensional image projection systems such as conventional computer monitors. These systems, although giving an increased impression of reality are constrained significantly by the imaging system in providing a natural design environment in which to work. To counter this, there are 3D visualisation systems, such as the CAVE system supplied by the Virtual Environment Lab, Virginia Tech, Blacksburg Va. 24081, which provide the operator with a true 3D image along with haptic feedback. This is a fully immersive system consisting of a room, onto the walls of which are projected images that are viewed as 3D using a suitable headset. These systems, although useful for visualisation, are not currently suited for design work. Thus they would only be used practically for briefings, demonstrations etc, to provide a more impressive, or more memorable presentation.

According to the present invention there is provided a Human-Computer Interface that comprises a set of sensors, actuators and computer generated controls, characterised in that the controls are projected in three spatial dimensions by a three dimensional display device and are manipulated by means of an operator interacting with them by movements of the operator's body, these movements being detected using the sensor system, where characteristics of a displayed target volume change according to the movement made, and actuators worn an the body react according to how the body interacts with the computer generated controls.

The advantages of this invention are that a natural and intuitive interface is provided that has the effect of simplifying the process of designing articles using a Computer Aided Design (CAD) system. The interface as described herein provides tools that are capable of manipulating images very quickly and naturally. As the HCI will be used on a 3D display system that is connected to a computer system, this also enables remote users to access the system by means of having their own 3D display connected to the same computer system by means of a network system.

The present invention provides the operators with an environment in which they can operate and interact with the computer, and hence the displayed design article, more naturally than using the systems of the prior art. It is a practical system that is readily useable for the purpose of design, or for demonstration of a design, and is also suitable to be used to give briefings and presentations to non-technical staff or customers. The design article to be displayed, or manipulated by the current invention will generally comprise of a 3D image and is known in this specification as a target volume.

The present invention could be fitted on to an existing system that incorporates a 3D display and haptic interface such as the prior art described above to provide the user, or operator, with a set of controls that are operated in a natural, intuitive manner that allow various parameters of a target volume to be adjusted.

The hand and forelimbs will be the most common part of the body used to adjust controls but it will be understood that any part of the body may be used if the sensor system is capable of detecting the position of that part of the body. Any reference to "hand", and to "glove" in this specification should be read in this context.

The present invention provides a set of interactive 3D icons that act as controls to, amongst other things, resize the target volume, or rotate it or move it linearly, in any of 3 spatial dimensions. Certain special types of controls that are projected in two dimensional (2D) form, and are known in the context of this specification as menu items may be displayed along with the 3D controls and can be used to control additional functions of the computer system.

The controls may be projected alongside the target volume, and the purpose of manipulating the controls is to change the view of the target volume. The target volume itself may be a control, or may have controls within it such that the target volume may be manipulated directly, without reference to other controls.

In use, the operator would choose an appropriate control for the operation he wishes to perform, and would reach out towards it. He is able to see the position of his hand, and so knows where the chosen control is in relation to his hand position. The computer system is able to know the position of the operator's hand by virtue of the sensors attached to it, and so also knows where the hand is in relation to the controls being projected. When the system detects that the hand has "contacted" a control it sends a feedback signal back to the actuators on the glove which will move in response to this "contact". This is known as haptic feedback. There are generally two types of haptic feedback, The first, known as "force feedback" can act upon the hand to stiffen its movements with varying degrees of force, to simulate contact with different types of materials. A mild stiffness will tend to feel like the user is holding something spongy, or the stiffness could vary according to how far the fingers moved, which would simulate a rubbery texture. Of course, in this context, "contact" does not mean the actual touching of two physical objects, but instead refers to the apparent touching of the hand/glove combination, or other body part, with the 3D image of a control that is being projected by the projection system.

When a contact with the control takes place, the computer system will understand that some manipulation of the control is intended by the operator. Further movements of the operators hand while it is in contact with the control, or while the control interprets the hand movements as applying to it, will be interpreted as attempts to change one or more of the parameters that may be adjusted with that control. Such movements made by a hand may be, but are not limited to, fingers moving in relation to each other, fingers moving in relation to the palm, rotations of the hand etc. Some controls may require that two hands are needed in order to modify a particular parameter. The appearance of the control itself can change according to the value of the parameter that is adjusted by that control. For example, a control that adjusts the size of the target volume may itself get smaller or larger according to the value to which the parameter is presently set. Or, the control may be drawn such that it appears to be an image within an image, such that a smaller image appears to be encased within a larger one. As the parameter is adjusted the relative sizes or positions of the two images changes accordingly. As another example, the control could be drawn as a cylinder, with various parameter options drawn onto the surface of the cylinder. In use, the cylinder could be spun around using the hand, or other part of the body, until the desired parameter option can be conveniently chosen.

The usual image manipulation tools that are provided in more conventional CAD software may be beneficially adapted to work under this system.

The type of feedback applied to the hand will vary according to the type of control that is contacted. Some controls will react so that, when contact is made with them a signal is sent to the glove to lock the position of the fingers. This gives the impression to the operator of touching a solid object. Other controls will react with a lesser feedback force to give the spongy feeling described above. In the context of this specification this is known as grasping. Other controls operate differently. The operator is able to immerse his hand into this sort of control, and influence parameters by means of movements of his hand whilst within the control. These are known as gesture controls. Certain menu items may be displayed in two dimensions. If the operator were to bring is finger into contact with one of these menu items the glove will exert a mild pressure on the finger to simulate the feeling of touch. Although described here are three different haptic feedback mechanisms, they are not mutually exclusive—i.e. more than one can be used simultaneously if appropriate for the type of control being used.

Before the HCI can be used, it should be calibrated. This process is used to synchronise the position of the operator's body in space with the position as seen by the computer system. Any differences in position, or action such as grasping or gesturing as seen by the operator and the computer system is accounted for by the computer system such that the operator does not notice the error.

The HCI as described herein is capable of being used on a computer system that has a 3D display. Of course, the computer system need not be in direct proximity to the display, but could be connected across a network of interconnecting computers. Existing software and hardware tools ran be used to implement the HCI.

One example of such a HCI will now be described, with reference to the accompanying drawings.

FIG. 1 shows a 3D workstation 6 displaying a target volume 1 and several controls 2, 3, 4, along with the hands of two operators 7.

Figure 2:
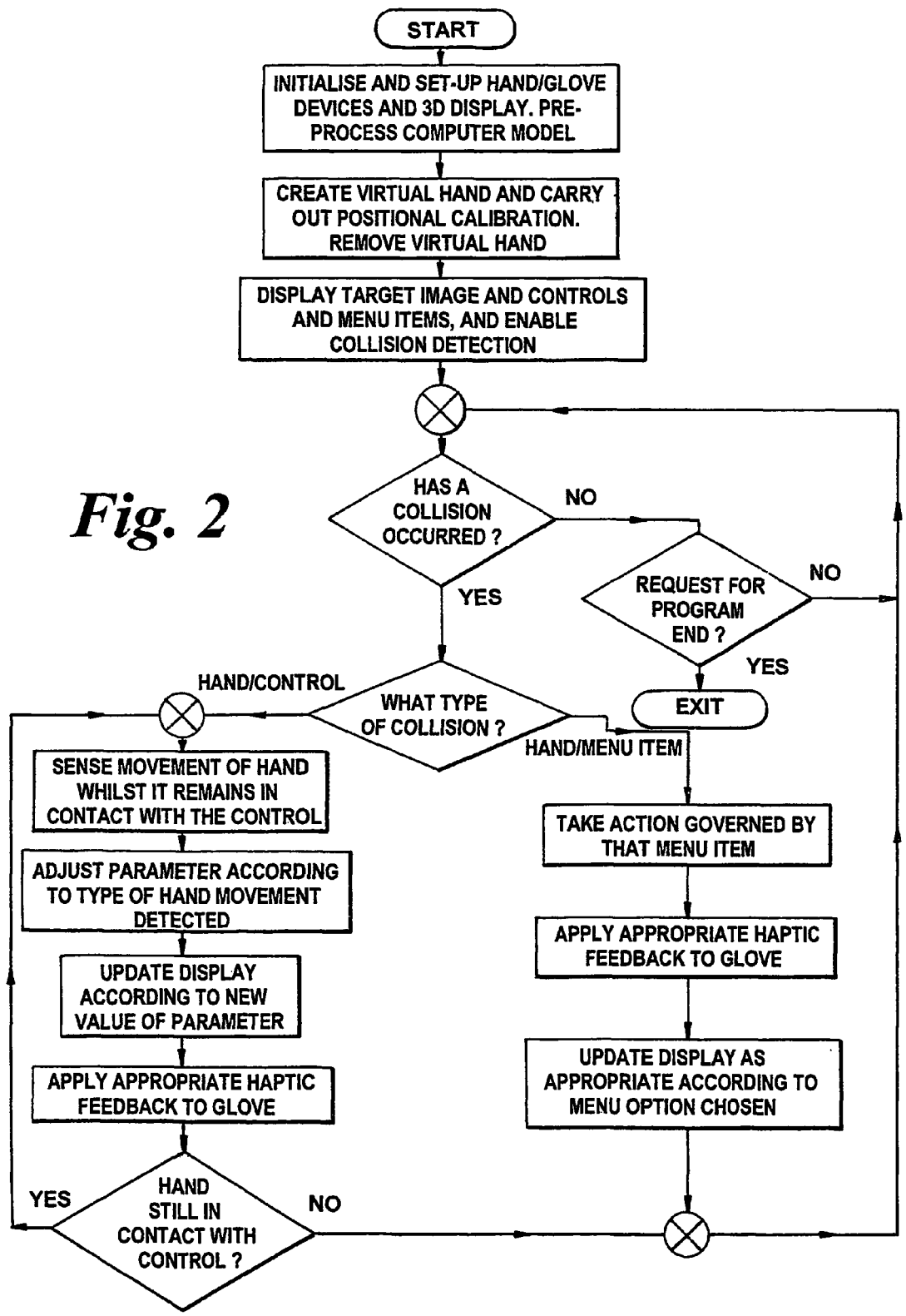

FIG. 2 shows in block representational form the functionality of the computer code that provides this HCI.

The 3D workstation used is manufactured by Fakespace Labs, Inc. of 241 Polaris ave. Mountain View Calif. 94043, USA, and provides a desk, above and upon which is presented a 3D image. The haptic feedback gloves are manufactured by Virtual Technologies Inc. of 2175 Park Boulevard, Paolo Alto, Calif. The sensor system for detecting the position of the gloves and head in space is provided by Polhemus Inc. of 1 Hercules Drive, PO Box 560, Colchester, Vt., 05446.

The person operating the HCI wears haptic feedback gloves 9 that are fitted with an array of sensors and/or actuators. The system as currently employed has a separate glove incorporating the force feedback mechanism from the glove that incorporates the touch actuators, although these can also be incorporated into the same glove. These provide the computer system with information as to the position of the hands 7, and also exhibit forces on the fingers to provide feedback that simulates what is felt when touching or grasping objects.

Before the system can be used accurately the sensor system must first be calibrated. This is done by having the computer display a "virtual" hand in a position according to where it detects the operator's hand as being. The operator then moves his own hand, if necessary, to be closely aligned to the virtual hand, and then provides an indication to this effect to the computer.

The present system also requires that the gesture and grasping action is similarly calibrated. This is done by touching one's thumb against the end of each of the fingers in turn for each hand. The virtual hand display is then switched off. The computer then calculates any error in the original positioning and subtracts this error when performing its subsequent calculations.

The target volume 1 is surrounded by a rollcage 2 that comprises three loops, 2a, 2b. 2c. Each loop 2× is orthogonal to the other loops of the rollcage. The rollcage 2 acts as a control and can be used to rotate the target volume 1 about the centre of the rollcage 2. This can be accomplished by means of the operator grasping one of the loops 2× of the rollcage 2 with his hand, and manipulating the loop according to the movement required. For example, to rotate the target volume about the vertical axis, the operator will grasp one of the loops 2a, 2c that has a main vertical dimension and spin it sideways until the target volume shows the desired view. Or, the operator can grasp the horizontal loop 2b and rotate this. The design of the rollcage 2 is such that is can also be rotated by any of the loops 2× in any rotational axis. Here, "rotate" should be taken to mean that a gesture imitating that of rotating a physical ring is made.

FIG. 1 also shows some controls towards the bottom of the picture. Some of these controls can also be used to rotate the target volume 1. Controls 3×, of which 3a shows a rollcage in miniature, and 3b, 3c and 3d show each individual loop of the rollcage 3a, can also be used to rotate the target image in a similar manner to the full size rollcage 2. Loops 3b, 3c and 3d can be grasped by the operator and rotated, which will have the effect of rotating the target volume about that particular loop's axis. When the operator's hand 7 gets close enough to the control 3, actuators in the glove 9 operate to resist movement of the fingers, to simulate the touching of a solid object.

Also shown in FIG. 1 are four controls 4.x that are used to resize the target volume 1. These are gesture icons. Each of these is drawn as a central cube with, in three cases 4*b*, 4*c*, 4*d*, shadow extensions in one dimension (all orthogonal to each other), and in the last case 4*a* a larger shadow cube enveloping a smaller one. To effect a resize, the operator places his hand 7 in contact with the chosen control and either moves his finger's to make a fist, or spreads his fingers out, which has the effect of making the target volume 1 smaller or larger respectively, Choosing a control with single dimension shadows will only resize the target volume 1 in that dimension, whereas choosing the control 4*a* with shadows in three dimensions will resize in all dimensions simultaneously.

FIG. 1 shows some other menu items 8 that are displayed in 2D format. When the operator's finger is brought into contact with one of these menu items the glove 9 will exert a mild pressure on the finger to simulate the feeling of touch. One such example of a 2D menu item is the keypad 5. This is used to input numerical data for any parameter that is capable of being controlled in this way.

All controls 2, 3, 4, 5, 8, and the target volume 1 are capable of being repositioned as desired by the operator, within the limitations of the display system 6, by grasping and pulling them to the desired position.

FIG. 2 shows a simplified schematic of the operation of the computer program that controls both the behaviour of the target volume and the controls and menu items projected by the 3D display. When the HCI computer code is activated the following steps are carried out:

a. Initialise body worn hardware, such as the gloves and any head gear that may be worn. Initialise sensor system. Pre-process the computer model that is to be used as the target volume such that it is prepared for display on the 3D display system. This is necessary so that it is provided with information on how to react with the haptic sensors within the gloves.

b. Initialise the 3D display unit, and create the image of a virtual hand for calibration purposes as described above. Carry out the calibration.

c. Display the 3D target volume and a set of controls and menu items. Enable the collision detection, i.e., activate the haptic feedback to the glove if it is sensed that the glove contacts with a control or menu item, and take appropriate action according to which control or menu item is contacted. Wait for collisions to occur or for the program to be ended.

d. If a collision is detected then take the following actions as appropriate:

e. If a hand-control collision, continue to sense the movements made by the hand as long as it stays in contact with the control. Adjust the parameter controlled by the control according to the movements made, and update the target volume display and control icon according to the new value of the parameter. Apply appropriate haptic feedback signals to the glove. Continue doing this process until it is detected that the hand is no longer in contact with the control.

f. If a hand-menu item collision, take the action governed by that menu item, and adjust the target value display and menu item icon as necessary. Apply appropriate haptic feedback signals to the glove.

g. Wait for more collisions to occur, or for program to be terminated. If a further collision is detected, then go back to step d. above.

The invention claimed is:

1. A human-computer interface between a human operator and a computer, said interface comprising:
   a set of sensors for sensing movement of said operator,
   at least one actuator configured to be worn by said operator,
   a three dimensional display device for projecting in three spatial dimensions computer generated controls into a displayed target volume, said display configured to allow said operator to view said target volume and to directly view at least a portion of said operator's body concurrently with said target volume, wherein said controls are configured to be manipulated by means of said operator interacting with said controls by movements of said portion of said operator's body, wherein characteristics of a displayed target volume change according to the movement made, and said at least one actuator react according to how the body interacts with the computer generated controls: and
   a calibration routine causing said display device to display a virtual image of said portion of said operator's body and permitting one of the position of the virtual image and said portion of said operator's body to be adjusted so that the virtual image and the portion of said operator's body appear to the operator to be visually coincident.

2. The human-computer interface according to claim 1 whereby at least one of the controls substantially surrounds the displayed target volume.

3. The human-computer interface according to claim 1 whereby the displayed target volume also acts a control.

4. The human-computer interface according to claim 1 whereby adjustment of a parameter handled by at least one of the controls is achievable by immersing part of the body into the control and moving that part of the body.

5. The human-computer interface as according to claim 1 whereby mechanical actuators attached to that part of the body that is in contact with the control are configured to operate to oppose movement of that part of the body.

6. The human-computer interface according to claim 1 whereby the three dimensional display system projects at least one of the controls such that it appears to be in two dimensions.

7. The human-computer interface according to claim 1 whereby any of the controls may be repositioned around the three dimensional display system by the user.

8. The human-computer interface according to claim 1, wherein said portion of said operator's body comprises a hand.

9. The human-computer interface according to claim 1, wherein said at least one actuator comprises a plurality of actuators.

10. A method controlling parameters of a 3D target volume of a three dimensional display system for interaction with an operator's body, said method comprising the steps of:
    locating a portion of said operator's body within said target volume;
    displaying an image of said portion of said operator's body within said target volume, whereby said portion of said operator's body and the image of said portion of said operator's body are concurrently viewable within said target volume;
    calibrating the display system so that said image of said body portion is coincident with said body portion as viewed by said operator;

detecting interaction by movement of said body portion with at least one computer generated control using a sensor system, generating a signal according to the body portion movement made, and varying at least one characteristic of the 3D target volume according to the signal.

11. The method of controlling parameters according to claim 10, wherein said locating step includes locating the operator's hand within said target volume.

12. A computer system for a human operator, said system comprising:

at least one processing means, a three dimensional display system, said display system projecting in three spatial dimensions into a target volume, said display system allowing said operator to directly view at least a portion of said operator's body;

at least one memory; and a human-computer interface, said interface comprising:

a set of sensors for sensing movement of a human operator, at least one actuator worn by said operator, a calibration routine causing said display system to display a virtual image of said portion of said operators body and permitting one of the position of the virtual image and said portion of said operator's body to be adjusted so that the virtual image and the actual position appear to the operator to be coincident; and computer generated controls, said controls projected in said target volume by said display device, said controls are manipulated by means of said operator interacting with said controls by movements of the operator's body, these movements being detected using said set of sensors, where characteristics of a displayed target volume change according to the movement made, and said at least one actuator reacts according to how the body interacts with the computer generated controls.

13. The computer system according to claim 12, wherein said portion of said operator's body comprises a hand.

14. The computer system according to claim 12, wherein said at least one actuator comprises a plurality of actuators.

15. The method according to claim 10 including substantially surrounding said target volume with said at least one computer generated control.

16. The method according to claim 10 including projecting said at least one computer generated control such that it appears to be in two dimensions.

17. A computer-readable medium containing instructions for controlling parameters of a 3D target volume of a three dimensional display system for interaction with an operator's body, wherein when the instructions are executed by at least one device they are operable to:

locate a portion of said operator's body within said target volume;

display an image of said portion of said operator's body within said target volume, whereby said portion of said operator's body and the image of said portion of said operator's body are concurrently viewable within said target volume;

calibrate the display system so that said image of said body portion is coincident with said body portion as viewed by said operator;

detect interaction by movement of said body portion with at least one computer generated control using a sensor system, generate a signal according to the body portion movement made, and vary at least one characteristic of the 3D target volume according to the signal.

18. The computer-readable medium according to claim 17 wherein the instructions are further operable to locate an operators hand within said target volume.

19. The computer-readable medium according to claim 17 wherein the instructions are further operable to substantially surround said target volume with said at least one computer generated control.

20. The computer-readable medium according to claim 17 wherein the instructions are further operable to project said at least one computer generated control such that it appears to be in two dimensions.

* * * * *

UNITED STATES PATENT AND TRADEMARK OFFICE
CERTIFICATE OF CORRECTION

PATENT NO.         : 7,312,786 B2
APPLICATION NO.    : 10/276992
DATED              : December 25, 2007
INVENTOR(S)        : Paul Anderson It is certified that error appears in the above-identified patent and that said Letters Patent is hereby corrected as shown below:

At column 1, line 3, below the title insert -- This application is the US national phase of international application PCT/GB01/02144 filed 17 May 2001, which designated the U.S. --.

At column 6, line 36, delete "interface as" and insert -- interface --, therefor.

At column 7, lines 24-25, delete "operators" and insert -- operator's --, therefor.

At column 8, line 32, delete "operators" and insert -- operator's --, therefor.

Signed and Sealed this

Twenty-second Day of September, 2009

David J. Kappos
*Director of the United States Patent and Trademark Office*